United States Patent [19]

Shea

[11] Patent Number: 5,895,034
[45] Date of Patent: Apr. 20, 1999

[54] DEVICE FOR HOLDING ELEMENTS DURING ASSEMBLY OF A WIRE HARNESS

[75] Inventor: Patrick J. Shea, El Paso, Tex.

[73] Assignee: UT Automotive Dearborn, Inc., Dearborn, Mich.

[21] Appl. No.: 08/689,637

[22] Filed: Aug. 13, 1996

[51] Int. Cl.⁶ .................................................. B23Q 3/00
[52] U.S. Cl. ........................... 269/3; 269/43; 269/287; 269/903
[58] Field of Search ................................ 269/3, 40, 43, 269/287, 903, 126, 127, 128; 211/60.1; 248/65, 68.1; 16/114 R

[56] References Cited

U.S. PATENT DOCUMENTS

| | | | |
|---|---|---|---|
| 922,115 | 5/1909 | Epperson | 269/3 |
| 1,987,159 | 1/1935 | Rasmussen | 211/60.1 |
| 2,001,666 | 5/1935 | Keil | 16/114 R |
| 2,537,750 | 1/1951 | Gretschel | 16/114 R |
| 2,928,443 | 3/1960 | Sevachko | 269/287 |
| 4,421,305 | 12/1983 | Kosmowski | 269/287 |
| 4,824,066 | 4/1989 | Smith | 269/287 |
| 5,090,645 | 2/1992 | Zuercher | 248/68.1 |
| 5,170,533 | 12/1992 | Barry | 16/114 R |

Primary Examiner—Robert C. Watson
Attorney, Agent, or Firm—Howard & Howard

[57] ABSTRACT

A method for holding elements, such as wires, during assembly of a wire harness is for use with a device which includes a partially longitudinally extending slot. The width of the slot is larger than the diameter of the cylindrical elements, so that the elements can be dropped into the slot. However, the width of the slot is small enough, such that upon loading the cylindrical elements into the slot the elements lie in substantially a row. The method includes dropping the elements into the slot, so that the elements are aligned in substantially a row.

12 Claims, 3 Drawing Sheets

5,895,034

DEVICE FOR HOLDING ELEMENTS DURING ASSEMBLY OF A WIRE HARNESS

TECHNICAL FIELD

The present invention relates to the assembly of wire harnesses, and more particularly to a method and a device for holding elements, such as wires, during assembly of a wire harness.

BACKGROUND OF THE INVENTION

Wire harnesses are large bundles of wire used to interconnect the electrical components of a vehicle to their respective controls and power source. The assembly of wire harnesses is a complex task. It is often not feasible to fully automate the assembly process due to the number of components and connectors being attached, the variety of harnesses assembled in a single factory, and the degree to which wire harnesses vary to accommodate different option packages within a given model vehicle.

An automated wire termination machine is problematic and includes a movable table, at least one die attached to the table, a cutting machine attached to the table, a payoff device for feeding the wire to the cutting machine, and a reel holder. The cutting machine cuts insulated wire into segments, strips the insulation off the ends of the wire segments. The reel holder includes a beam extending from the table, and a spindle rigidly attached to the beam. Typically, the terminals come in the form of strips on a reel. The reel is rotatably mounted on the spindle. The stripped ends of the wire segments and the strips of terminals are continuously fed to the die. The die crimps the terminal around the stripped end of the wire resulting in an electrically conductive connection between the two elements. The termination machine drops the completed wires into a tray. The wires are transported to an assembly area within the factory where the wires are laid onto a jig, and connected to other electrical components or arms of the wire harness by inserting the terminals into mating connectors. Typically the terminals are small delicate components.

Since the wires can get tangled during transportation within the factory, the operator prepares the wires for transportation by manually bundling the wires. First by aligning the ends of the wires in a flush manner, then using some material, such as film, to secure the ends together. Although bundling the wires in this way reduces tangling of the wires when they are moved, this method is problematic.

The terminals are small and include tabs for securing the terminals in mating the connectors. The tabs bend and break fairly easily. Since the film is wrapped over the terminals under tension, this causes deformation and damage to the terminals, which increases the costs of manufacturing. Furthermore, the materials used to secure the ends often are not biodegradable, thus not environmentally friendly. Some countries do not allow such materials to be disposed of there. The added cost of shipping this material elsewhere for disposal increases the operating costs of the factory. In addition, removing the material from the terminals can deform the tabs or unlatch the terminal, once either of these events occurs the terminal cannot be used because it will not meet the necessary requirements.

To ease the manual process of forming wire harnesses, stands are used in the assembly area to assist the worker in both separating and holding the wire supply during assembly. Typically these stands have separate areas for each type of wire, and allow the bundles of wires to be laid there so that the ends of the bundle are not in contact. After the bundles are transported to the proper assembly area, they are unwrapped, and placed on the stands. The assembly person removes each circuit as necessary during assembly by pulling the wire off the stand by the proximate end. This method is problematic because the distal end of the chosen wire must be pulled through all the other wires, which can cause the wires to tangle and/or cause deformation and damage to the distal terminals. In order to decrease tangles and damage to the terminals during assembly, the terminal least likely to tangle is placed at the distal end of the bundle. Although this orientation decreases tangles and damage, orienting the wires this way may decrease the efficiency of the operator since he may be required to rotate the circuit prior to use.

Therefore, an improved method for manufacturing wire harnesses and an improved device for holding wires during assembly are sought. These improvements minimizing tangling of the wires during assembly, decreasing the number of terminals damaged and deformed during manufacture, eliminating the use of wrapping materials, and allowing the wires to be held in an orientation which does not decrease the efficiency of the assembly person.

SUMMARY OF THE INVENTION

According to an embodiment of the present invention, a device for holding a plurality of cylindrical elements having a diameter includes a frame. The frame forms a partially longitudinally extending slot. The width of the slot is larger than the diameter of the cylindrical elements, so that the elements can be dropped into the slot. However, the width of the slot is small enough, such that upon loading the cylindrical elements into the slot the elements lie in substantially a row. When taken to the assembly area the device is attached to a stand. The device is supported so that the elements are side-by-side and the elements are removed without pulling one end through the other elements. By aligning the cylindrical elements in a row tangling and damage to the elements during manufacturing is substantially minimized.

The foregoing invention will become more apparent in the following detailed description of the best mode for carrying out the invention and in the accompanying drawings.

BEST MODE FOR CARRYING OUT AN EMBODIMENT OF THE INVENTION

Figure 1:
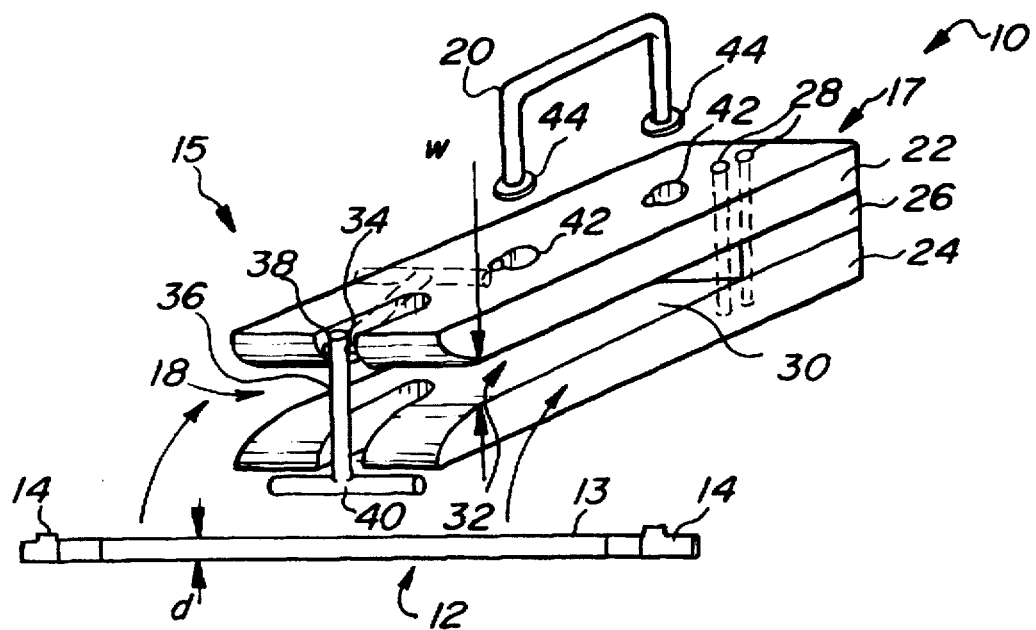
FIG. 1 is a perspective view of a device for holding cylindrical elements of the present invention.

Referring to FIG. 1, a device 10 for holding cylindrical elements 12 is shown. The cylindrical elements 12 have a diameter d. The cylindrical elements 12 in this application are wires for use in forming wire harnesses. The wires 12 are insulated wire segments 13 with terminals 14 connected to the ends.

The device 10 has a proximal end 15 and a distal end 16. The device 10 includes a frame 17, and may include a latching mechanism 18, and a handle 20. In this embodiment, the frame 17 includes a first element 22, a second element 24, a spacer 26, and fasteners 28.

The first element 22 is spaced from and substantially parallel to the second element 24. The spacer 26 is disposed at the distal end of the frame 17, between the first element 22 and the second element 24. The fasteners 28 extend through the first element 22, the spacer 26, and the second element 24 forming a partially longitudinally extending slot 30 between the first element 22 and the second element 24. The opening 32 of the slot is at the proximal end 15 of the frame. The slot 30 has a width w larger than the diameter of the cylindrical elements 12, so that the elements move freely within the slot. The width further is small enough such that upon loading the cylindrical elements 12 lie in substantially a row. It is preferred that the slot width w is less than 30% larger than the diameter d of the cylindrical elements 12. Several factors that determine the slot width are the gauge of the wire, the diameter of the wire, and the stickiness of the insulation.

The first and second elements 22 and 24 each include cutouts 34 and 36, respectively. The latching mechanism 18 for securing the wires 12 once loaded into the device 10, includes a rod 38 and a T-shaped bar 40. The T-shaped bar forms a bore (not shown) in one end. The rod 38 extends across the cutout 34, and through the bore in the T-shaped bar 40. Thus, the T-shaped bar 40 is pivotally attached to the first element 22.

In the closed position, the T-shaped bar 40 is disposed across the slot 30 and is within the cutout 36 in the second element 24, such that any cylindrical elements 12 loaded within the slot 30 are not able to slide out of the slot 30. In the open position (as shown in phantom), the T-shaped bar 40 is not disposed across the slot 30, such that any cylindrical elements 12 may be loaded or unloaded from the slot 30.

The first element 22 further includes two pear shaped cavities 42 in the upper surface. The handle 20 includes a circular disk 44 at each end which when inserted into the cavities 42 removably secures the handle 44 to the frame 17. The device 10 can be manufactured from wood or injection molded from plastic.

Figure 2:
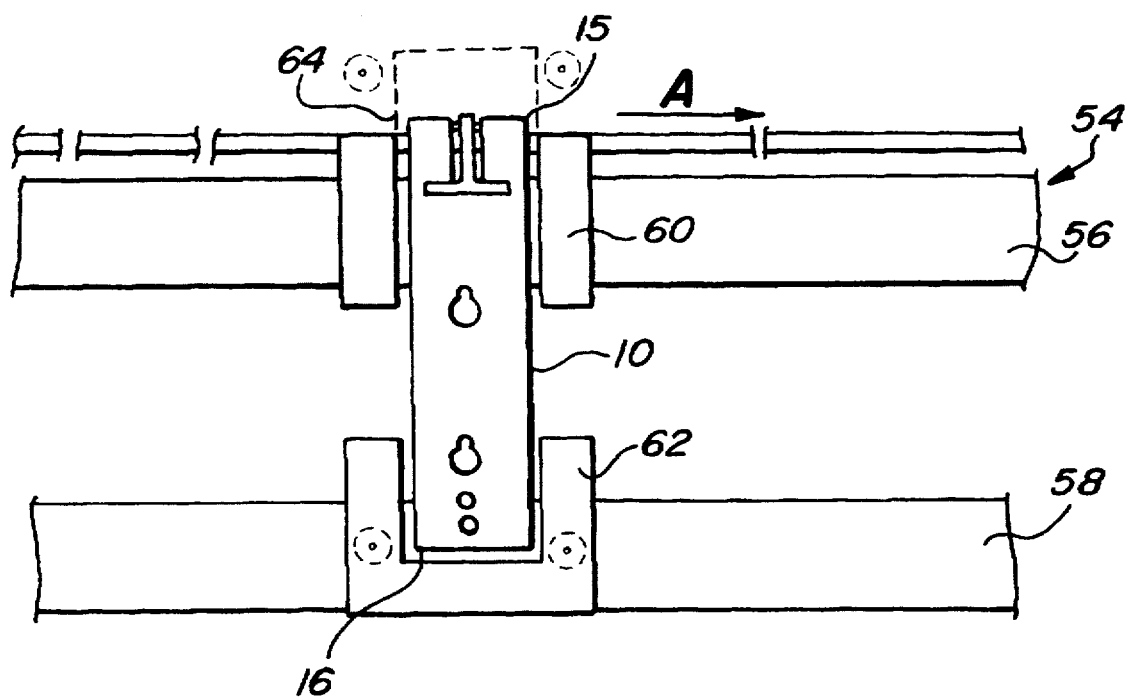
FIG. 2 is a front view of the device of the present invention loaded in a support on a termination machine.

Referring to FIG. 2, the device 10 is loaded into an automated termination machine 54. The termination machine 54 typically has an upper track 56 and lower tray 58. The wires 12 travel out of the machine along the direction designated by the arrow A. Once the entire circuit is deposited on the track 56 the circuit 12 falls into the tray 58, where in the prior art method the wires piled upon one another. The termination machine 54 has been modified, to include an upper support 60 attached to the upper track 56 and a lower support 62 attached to the tray 58. The device 10 is loaded with the T-shaped bar 40 in the open position. The device 10 is positioned so that the distal end 16 fits within the lower support 62, and the proximal end 18 fits within the upper support 60. The supports may be bolted directly to the track 56 and the tray 58 or to a bracket (not shown) which is attached to the track and the tray.

The method of holding a plurality of cylindrical elements, such as wires, will now be described. Referring to FIGS. 1 and 2, locate the device 10 below the supply of cylindrical elements within the termination machine 54, such that the opening 32 of the slot 30 is in close proximity to the elements 12. Then, drop the cylindrical elements 12 into the slot 30.

Figure 3:
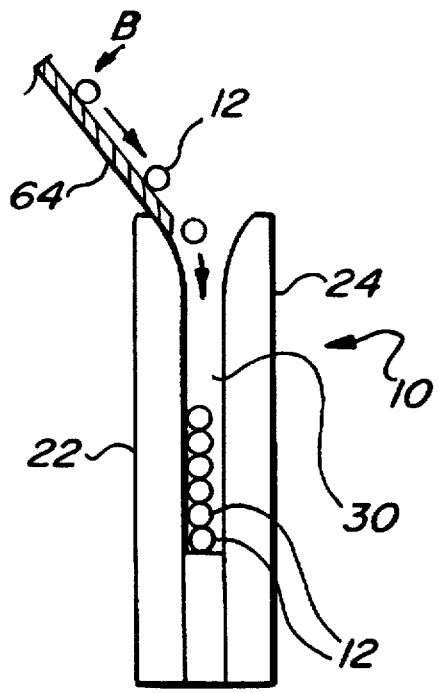
FIG. 3 is a sectional view along line 4—4 of the device of FIG. 1 during loading of the cylindrical elements.

Referring to FIG. 3, the elements 12 are dropped as illustrated by the arrow B, so that the element 12 contacts the guide 64 and rolls or slides into the slot 30. As each element 12 is serially dropped, the elements stack up in the slot 30 forming a single row of elements. Once loading is complete, the disks 44 of the handle 20 (as shown in FIG. 1) are inserted into the pear shaped cavities 42 and the device 10 is removed from the termination machine 54 with the elements 12 therein. Once removed the T-shaped bar 18 is moved from the open position to the closed position, thereby securing the cylindrical elements 12 within the slot 30.

Figure 4:
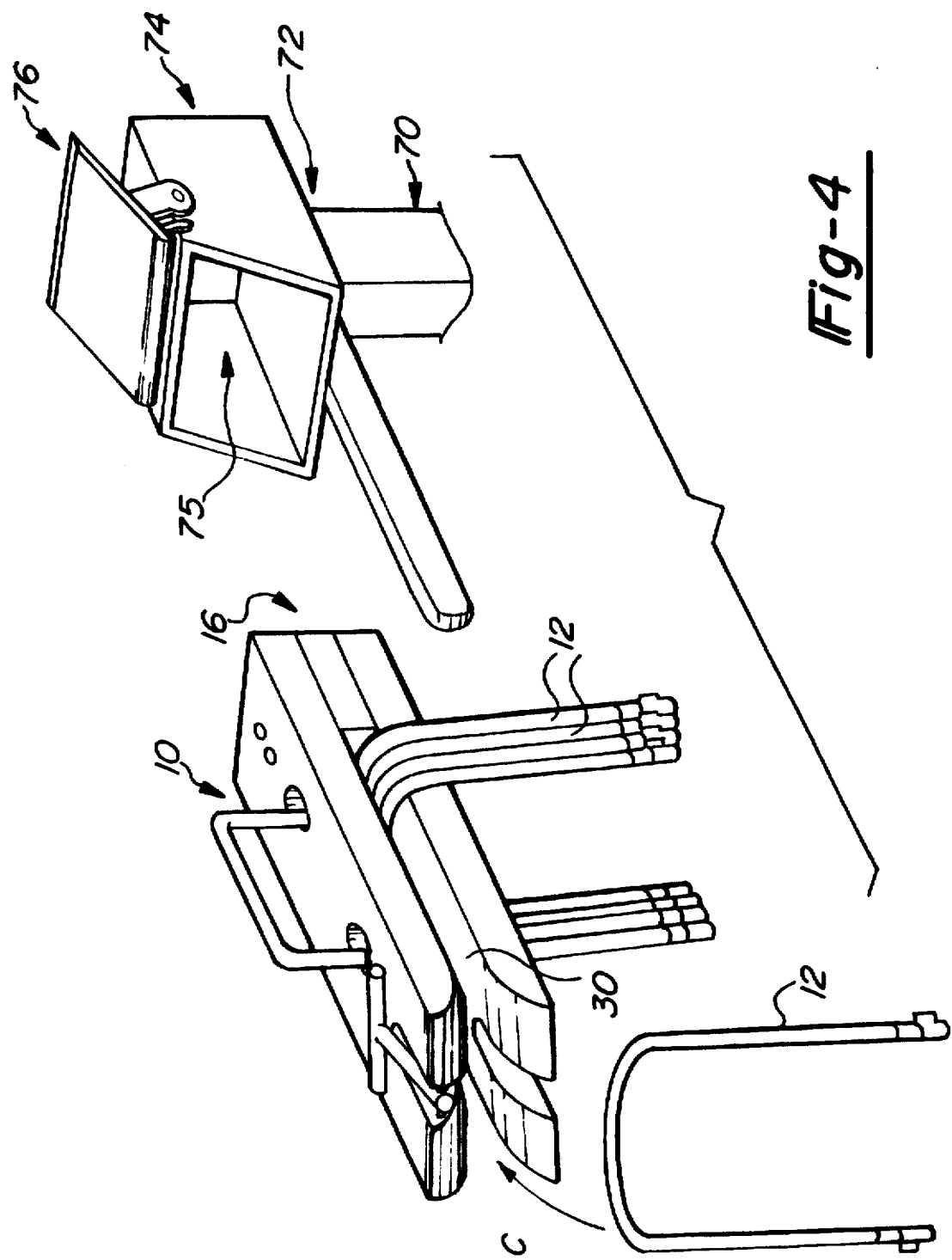
FIG. 4 is a perspective view of the device of FIG. 1 during unloading of the cylindrical elements.

Referring to FIG. 4, the operator moves the device 10 to a stand 70 in the wire harness assembly area. The stand 70 has a platform 72, a housing 74 attached to the platform 72. The housing includes a cavity 75, and a clamping mechanism 76. The distal end 16 of the device 10 is inserted into the cavity 75. Once the clamping mechanism 76 is engaged, the device is secured to the stand 70, such that the cylindrical elements 12 will remain within the slot 30, once the T-shaped bar 40 is in the open position. With the device 10 in this orientation, the slot 30 is substantially parallel to the floor of the factory, within the range of ±10°.

Next, the operator moves the T-shaped bar 40 from the closed position (not shown) to the open position. After which the cylindrical elements 12 are removed from the slot 20, as illustrated by the arrow C, and used to form a wire harness. With a number of stands in each assembly area with each device holding a different type of wire, the operator can form the wire harness.

Figure 5:
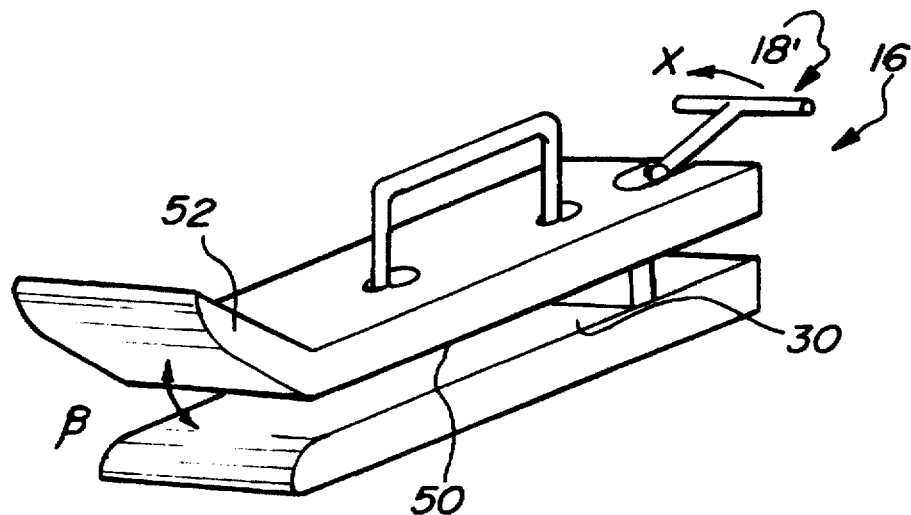
FIG. 5 is a perspective view of another embodiment of the device for holding cylindrical elements of the present invention.

Referring to FIG. 5, the device 10 may be modified so that the latching mechanism is modified 18' and moved to the distal end 16 of the frame 17. By moving the latching mechanism 18' according to the arrow X from the open position to the closed position the first element 22 and the second element 24 are moved into closer proximity, thus a clamping force is exerted on any wires (not shown) within the slot 30.

The device 10 may be further modified so that the first element 22 further includes a first portion 50 and an angled second portion 52. The angle B of the second portion 52 being sufficient that upon loading the cylindrical elements 12 (shown in FIG. 1), the angle guides the element into the slot 30. When the first element 22 is angled, the guide 64 (as shown in FIG. 3) is no longer necessary. It is preferred that the angle B is about 15° between the inner surface of the first portion 22 and the inner surface of the second portion 24. It is recommended that the angle be between 0° and 20°.

The principal advantage of the present invention is that using the device minimizes tangling and damage to the wires during manufacturing. This advantage occurs because the wires are stored and transported without being wrapped, and because the wires are held in a single row. As a result holding the wires in a single row instead of a bundle, the wires tangle less. Furthermore, using the device in the assembly area eliminates the need to pull the terminals through one another in a bundle during wire harness formation. The wires are therefore removed from the device with minimal tangling and damage. By eliminating the wrapping material the costs and time associated with disposal of this material are also eliminated. In addition, manufacturing time decreases, since the wires can be oriented to increase the assembly efficiency.

Yet another advantage is that the method and the device utilize gravity to load the wires into the device. This passive loading eliminates the need for mechanical devices that inserts the wires into the device, thereby making the device easy to manufacture. Additional advantages include that the device can be attached with few modifications to existing termination machines, the device is inexpensive to make, requires minimal training to implement in production, the device is reusable, and one device can be used with a number of wire gauges by using a variety of spacers.

While a particular invention has been described with reference to illustrated embodiments, various modifications of the illustrative embodiments, as well as additional embodiments of the invention, will be apparent to persons skilled in the art upon reference to this description without departing from the spirit and scope of the invention, as recited in the claims appended hereto. These modifications include but are not limited to using a handle which is integral with the first element. The width of the slot may be modified for different gages of insulated wire. The length of the lost may be modified to accommodate more or less wires. More than one device can be used on a single machine. The device may be mounted with rollers, or the like to vary its position on the track and tray. The device can be magazine loaded for continuous feed. It is therefore contemplated that the appended claims will cover any such modification or embodiments that fall within the true scope of the invention.

I claim:

1. A device for holding a plurality of cylindrical elements having a diameter, wherein said device comprises:

a frame, said frame having a partially longitudinally extending slot, said slot having a width larger than the diameter of the cylindrical elements and being small enough such that upon loading, the cylindrical elements lie substantially in a row, said frame further including a latching mechanism including a bar pivotally mounted to said frame, said bar having an open position wherein said latch is disposed substantially outside of said slot and, said latch having a closed position wherein said latch is disposed substantially within said slot.

2. The device of claim 1, wherein the width of said slot is less than 30% larger than the diameter of the cylindrical elements.

3. The device of claim 1, wherein the device further consists of a handle being connected to said frame.

4. The device of claim 3, wherein sad handle is removably connected to said frame.

5. A device for holding a plurality of cylindrical elements having a diameter, wherein said device comprises:

a first element;

a second element being spaced apart from and substantially parallel to said first element;

a spacer disposed between said first element and said second element, said spacer and said first and second elements define a partially longitudinally extending slot therebetween extending between first and second ends;

a fastener extending through said first element, said spacer, and said second element, said slot having a width larger than the diameter of the cylindrical elements throughout the entire distance between said first and second ends, and being small enough such that upon loading, the cylindrical elements lie substantially in a row; and a closure movable between an open position and a closed position, said closure being movable to said open position to allow the cylindrical elements to enter said slot without contacting said first and second elements, and said closure being movable to said closed position to close said slot.

6. The device of claim 5, wherein the width of slot is less than 30% larger than the diameter of the cylindrical elements.

7. The device of claim 5, wherein said closure includes a latching mechanism including a bar being pivotally mounted to said frame, said bar having an open position where said latch is outside the slot, and said bar frame having a closed position where said bar is across the slot.

8. The device of claim 5, wherein the device further consists of a handle being connected to said first element.

9. The device of claim 8, wherein said handle is removably connected to said first element.

10. The device of claim 5, wherein said first element includes a first portion and an angled second portion, said angle of said second portion being sufficient that upon loading the cylindrical element said angle guides the element into said slot.

11. The device of claim 10, wherein said angle is between about 0° to about 20° between said inner surface of said first portion and said inner surface of said second portion.

12. The device of claim 10, wherein said angle is about 15° between said inner surface of said first portion and said inner surface of said second portion.

* * * * *